(12) United States Patent
So et al.

(10) Patent No.: US 12,429,573 B2
(45) Date of Patent: Sep. 30, 2025

(54) METHOD AND APPARATUS WITH TARGET DETECTION

(71) Applicant: SAMSUNG ELECTRO-MECHANICS CO., LTD., Suwon-si (KR)

(72) Inventors: Won Wook So, Suwon-si (KR); Gilha Lee, Suwon-si (KR); Taegyu Ryu, Suwon-si (KR); YunJong Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 297 days.

(21) Appl. No.: 18/103,089

(22) Filed: Jan. 30, 2023

(65) Prior Publication Data

US 2024/0142597 A1 May 2, 2024

(30) Foreign Application Priority Data

Oct. 28, 2022 (KR) ........................ 10-2022-0141355

(51) Int. Cl.
*G01S 13/46* (2006.01)
*G01S 13/86* (2006.01)
*G01S 13/931* (2020.01)

(52) U.S. Cl.
CPC ............ *G01S 13/46* (2013.01); *G01S 13/867* (2013.01); *G01S 13/931* (2013.01); *G01S 2013/462* (2013.01); *G01S 2013/93271* (2020.01); *G01S 2013/93275* (2020.01)

(58) Field of Classification Search
CPC ...... G01S 13/46; G01S 13/867; G01S 13/931; G01S 2013/93275; G01S 2013/93271; G01S 2013/462
See application file for complete search history.

(56) References Cited

U.S. PATENT DOCUMENTS

| | | | |
|---|---|---|---|
| 6,680,689 B1 * | 1/2004 | Zoratti | B60Q 9/008 340/436 |
| 2019/0339349 A1 * | 11/2019 | Harrison | G01S 5/021 |
| 2020/0132826 A1 | 4/2020 | Achour | |
| 2022/0163649 A1 | 5/2022 | Li et al. | |

(Continued)

FOREIGN PATENT DOCUMENTS

| | | | | |
|---|---|---|---|---|
| DE | 102017106931 A1 * | 10/2017 | | G01S 13/42 |
| JP | 2022-526819 A | 5/2022 | | |

*Primary Examiner* — Vladimir Magloire
*Assistant Examiner* — Nazra Nur Waheed
(74) *Attorney, Agent, or Firm* — NSIP Law

(57) ABSTRACT

Disclosed is a method of detecting a moving target by a target detecting apparatus. The method includes: acquiring radar data from a radar installed in a vehicle, extracting location coordinates of a moving target from the radar data, obtaining a line of a reflective surface on which a signal of the radar is reflected using location coordinates of a fixed object, determining whether the moving target is in a Line of Sight (LOS) area of the radar or in a Non Line of Sight (NLOS) area of the radar based on the location coordinates of the moving target and the line segment of the reflective surface, and based on determining that the moving target is in an area corresponding to the NLOS area of the radar, converting the location coordinates of the moving target into actual coordinates corresponding to an actual location of the moving target.

13 Claims, 11 Drawing Sheets

(56) References Cited

U.S. PATENT DOCUMENTS

2022/0357419 A1* 11/2022 Givehchian ............ G01S 13/878
2023/0144600 A1*  5/2023 Jokanovic ............... G01S 7/414
                                                              342/70

* cited by examiner

METHOD AND APPARATUS WITH TARGET DETECTION

CROSS-REFERENCE TO RELATED APPLICATIONS

This application claims priority to, and the benefit, of Korean Patent Application No. 10-2022-0141355 filed in the Korean Intellectual Property Office on Oct. 28, 2022, the entire contents of which are incorporated herein by reference.

BACKGROUND

1. Field

The present disclosure relates to a method and an apparatus for detecting a target by using a radar and a camera installed in a vehicle.

2. Description of Related Art

For the safety of vehicles and pedestrians, vehicles are equipped with various sensors, such as ultrasonic sensors, cameras, radars, and lidars, that recognize the surrounding environment. These sensors may detect people, vehicles, animals, moving objects, and the like within a Line Of Sight (LOS) area. In contrast, the sensors may not be able to detect people or vehicles obscured by buildings, walls, or adjacent vehicles. That is, the sensors mounted on the vehicle can detect a target within a visible range, but cannot detect a target within a Non-Line Of Sight (NLOS) area.

For example, the sensors equipped in a vehicle cannot recognize objects obscured by obstacles, and thus may not provide warning to a traveling vehicle when a child suddenly jumps out between vehicles parked the side of a road, when a bicycle, person, motorcycle, vehicle, or the like suddenly appears at an intersection in a narrow one-way lane of one-way traffic, or when there is a pedestrian approaching from the sidewalk when a vehicle enters the road from an underground parking lot or a parking lot hidden by a concrete wall.

On the other hand, a front camera used in a vehicle may detect the surrounding environment at a remote distance and a short distance by using cameras having a narrow-angle and wide-angle fields of view (FOV), such as a trifocal camera. However, these cameras may not be able to detect targets obscured by obstacles, such as buildings, walls, and vehicles.

In addition, there is a recent trend that a corner radar is mounted on a bumper of a vehicle for safety. However, the corner radar installed on the right side of the vehicle bumper mainly detects targets approaching from the right lane or the right side of an intersection (the side opposite the driver's side), and the corner radar installed on the left side of the vehicle bumper mainly detects targets approaching from the left lane or the left side of an intersection. Even these corner radars cannot detect targets obscured by obstacles located on the left and right sides of the vehicle.

As described above, various sensors currently applied to vehicles have a problem in only detecting targets within the direct LOS area that a sensor can see from a straight line distance, but not detecting targets in the NLOS area obscured by various obstacles, such as buildings at intersections, billboards, information boards, vehicles parked on the left and right sides, and travelling large vehicles in the next lane on the road. In particular, this problem may become more serious in a vehicle using only camera systems.

The above information disclosed in this Background section is only for enhancement of understanding of the background of the described technology, and therefore it may contain information that does not constitute prior art or knowledge.

SUMMARY

Embodiments are to provide a target detecting method and apparatus capable of distinguishing whether a detected target is in a Line of Sight (LOS) area or a Non-Line of Sight (NLOS) area.

In one general aspect, a method of detecting a moving target includes acquiring radar data from at least one radar installed in a vehicle, extracting location coordinates of a moving target from the radar data, obtaining a line of a reflective surface on which a signal of the radar is reflected by using location coordinates of a fixed object located within a sensing range of the radar, determining whether the moving target is in an area corresponding to a Line of Sight (LOS) area of the radar or is in an area corresponding to a Non Line of Sight (NLOS) area of the radar based on the location coordinates of the moving target and the line segment of the reflective surface, and based on determining that the moving target is in an area corresponding to the NLOS area of the radar, converting the location coordinates of the moving target into actual coordinates corresponding to an actual location of the moving target.

The obtaining of the line of the reflective surface may include extracting location coordinates of the fixed object from a camera image acquired through a camera installed in the vehicle.

The obtaining of the line of the reflective surface further may include extracting location coordinates of a first end point of the fixed object and location coordinates of a second end point of the fixed object recognized within a sensing area of the camera, based on the image, and defining the line of the reflective surface based on the location coordinates of the first end point and the location coordinates of the second end point.

The obtaining of the line of the reflective surface may includes acquiring a driving direction and a driving speed of the vehicle, distinguishing the fixed object from at least one target detected from the radar data by using the driving direction and the driving speed of the vehicle, and extracting location coordinates of the fixed object from the radar data.

The distinguishing may include estimating a speed of the at least first and second targets from the radar data, classifying the first target as a fixed object based on the first target having the same speed as the driving speed in the driving direction, and classifying the second target as a moving target based on the second target not having the same a same direction and speed as the driving direction and the driving speed.

The obtaining of the line of the reflective surface further may further include extracting location coordinates of a first point of the fixed object and a location coordinates of a second point of the fixed object from the radar data, and defining the line of the reflective surface based on the location coordinates of the first point and the location coordinates of the second point.

The determining may include determining whether a target line between a location corresponding to a center of the radar to the location coordinates of the moving target intersects the line of the reflective surface, and when determined that the target line intersects the line of the reflective surface, determining that the moving target is in an area corresponding to the NLOS area of the radar.

The converting may include calculating the actual location coordinates by mirroring the location coordinates of the moving target relative to the line of the reflective surface.

In one general aspect, an apparatus for detecting a target includes a radar installed in a vehicle and acquiring radar data, one or more processors, memory storing instructions configured to, when executed by the one or more processors, cause the one or more processors to: determine whether a moving target is in an area corresponding to a Line of Sight (LOS) area or Non Line of Sight (NLOS) area of the radar by using location coordinates of a fixed object in a sensing range of the radar and location coordinates of the moving target extracted from the radar data; and convert the location coordinates of the moving target into actual location coordinates when the moving target is determined to be in an area corresponding to the NLOS area.

The instructions may be further configured to cause the one or more processors to extract location coordinates of the fixed object from a camera image acquired through a camera installed in the vehicle, and extract the location coordinates of the moving target from the radar data.

The instructions may be further configured to cause the one or more processors to acquire a driving direction and a driving speed of the vehicle, and classify the fixed object as fixed and classify the moving target as moving by using the driving direction and the driving speed of the vehicle.

The instructions may be further configured to cause the one or more processors to estimate a speed from the radar data, classify the fixed object as being fixed based on the fixed object having the same speed as the driving speed in the driving direction, and classify the moving target as being moving based on the moving target having a direction and speed that differs from the driving direction and the driving speed.

The instructions may be further configured to cause the one or more processors to define a line segment of a reflective surface based on location coordinates of a first point of the fixed object and location coordinates of a second point of the fixed object, the line segment corresponding the reflective surface on which a signal of the radar is reflected, and determine that the moving target is in an area corresponding to the NLOS area when a target line from a location corresponding to a center of the radar to the location coordinates of the moving target crosses the defined line of the reflective surface.

The instructions may be further configured to cause the one or more processors to calculate the actual location coordinates by mirroring the location coordinates of the moving target based on the line segment of the reflective surface.

The instructions may be further configured to cause the one or more processors to display graphics representing the moving target in an image area corresponding to the LOS area and for display graphics representing the moving target in an image area corresponding to the location coordinates of the moving target in an image area corresponding to the NLOS area.

In one general aspect, a method performed by a computing device includes extracting a location of a moving object from radar data obtained from a radar sensor of a vehicle sensing a locale of the vehicle, the locale including the moving object and a fixed object, extracting a line of the fixed object from an image of the locale of the vehicle, determining that the line is between a location of the radar and the extracted location of the moving object, and based thereon adjusting the extracted location of the moving object to compensate for reflection by the fixed object.

The adjusting may include translating the extracted location based on the extracted location prior to the adjusting and based on the line.

The initial extracted location may correspond to a virtual location of the moving object based on reflection of a signal of the radar from the moving object and off of the fixed object, and the adjusted extracted location of the moving object may correspond to the true location of the moving object.

The true location of the moving object may not be within line of sight of the radar when the radar data is acquired.

The image may be acquired from a camera installed in the vehicle.

DETAILED DESCRIPTION

Figure 1:
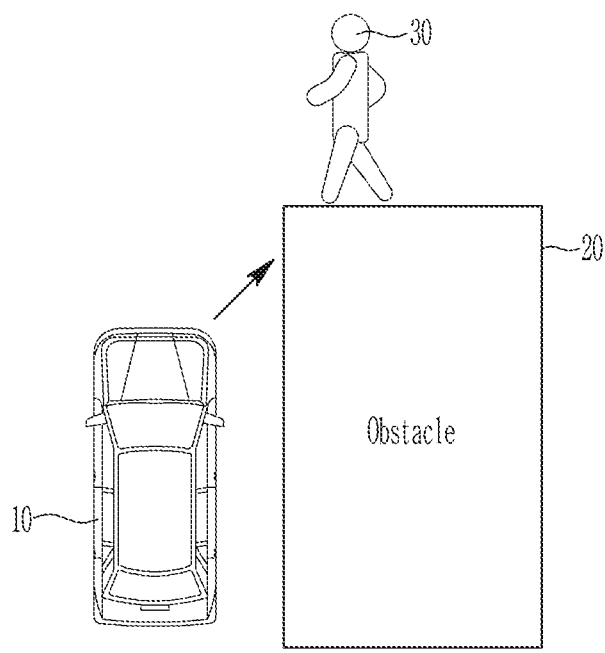
FIG. 1 illustrates an example of a Non Line of Sight (NLOS) environment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, a target detecting method and apparatus according to an exemplary embodiment of the present disclosure will be described in detail with reference to the drawings.

As sensor systems of vehicles evolve in the direction of generating 4D (distance, speed, angle, height) images, and to this end, when targets are detected, a sensor should be able to distinguish between targets in the LOS area of the sensor and targets in the NLOS area of the sensor. This may enable functions such as notifying the driver or system of the distinguishment result, and when a target in the NLOS area is detected, it may be possible to inform the driver (or an autonomous driving system) before the target enters the LOS area of the sensor (or the driver) so that the driver (or the autonomous driving system) can respond appropriately, e.g., by driving at low speed or stopping.

FIG. 1 illustrates an example of a Non Line of Sight (NLOS) environment.

Referring to FIG. 1, when there is an obstacle 20 obstructing the view on the left or right side of a travelling vehicle 10, and there is a moving target 30, such as a vehicle or a person, beyond the obstacle 20, a NLOS situation occurs. In this situation, it is not practical to detect the moving target 30 located in the NLOS area, e.g., by directly penetrating or diffracting the obstacle 20 using various sensors in the vehicle 10.

The obstacle 20 may be a building, a fence, a sound barrier, a vehicle parked in a parking area, a large travelling vehicle in the next lane, a billboard, an information board, and generally, any non-moving physical feature near the vehicle 10.

Figure 2:
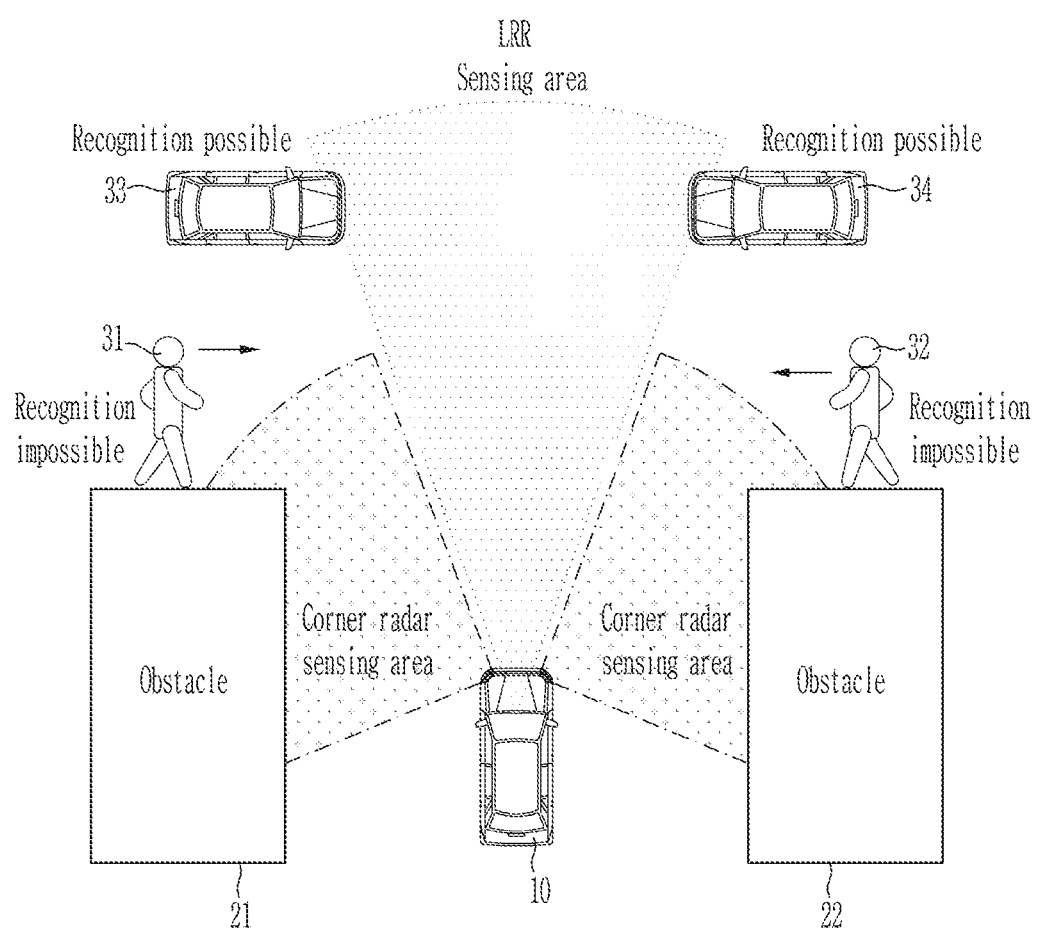
FIG. 2 illustrates sensing areas of a corner radar and a front radar mounted on a vehicle, according to one or more embodiments.

FIG. 2 illustrates sensing areas of a corner radar and a front radar mounted on a vehicle, according to one or more embodiments.

Referring to FIG. 2, in general, corner radars are mounted on left and right corners of a bumper of a vehicle, respectively, and a long range radar (LRR) is mounted on the front of the vehicle.

Each radar sensor installed in the vehicle has a sensing area. A radar sensor may detect a target within its sensing area by transmitting a radar signal from an installed position and receiving a radar signal reflected from the target.

In this case, when obstacles 21 and 22 are located on the left and right sides of the vehicle 10, respectively, in the driving direction of the vehicle 10, it is possible to recognize targets 33 and 34 with the LRR radar, for example, mounted on the front of the vehicle 10, but targets 31 and 32 in the NLOS area cannot be recognized by the corner radars due to the obstacles 21 and 22.

Object detecting apparatuses according to one or more embodiments detect an object in the NLOS area by utilizing a reflection characteristic of a radar.

Figure 3:
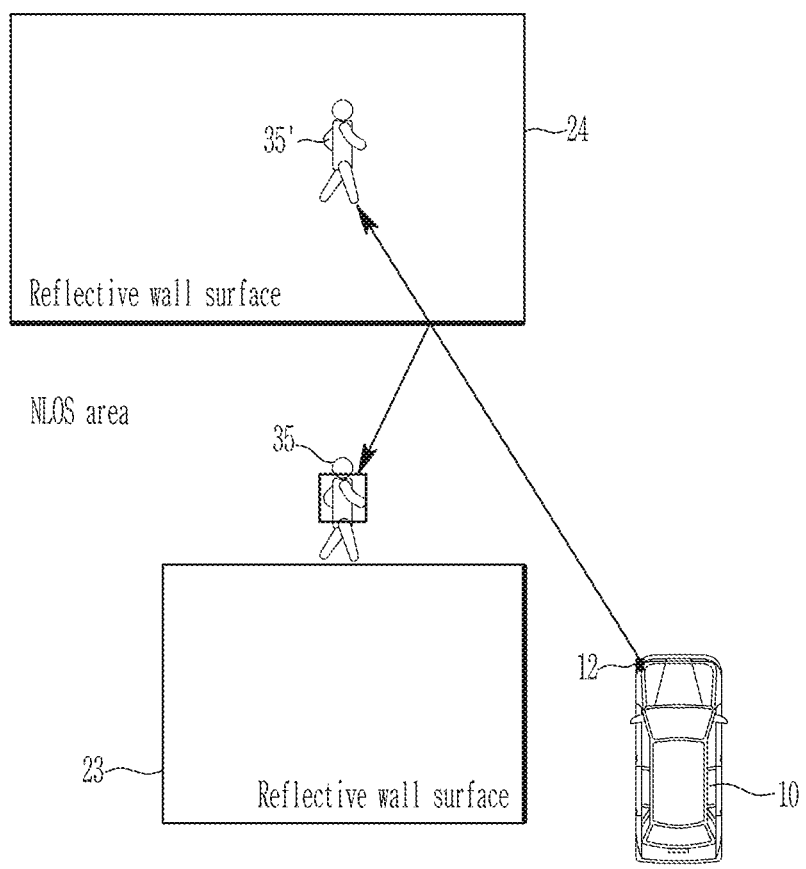
FIG. 3 illustrates a method of detecting a target in an NLOS area by utilizing reflection characteristics of a radar, according to one or more embodiments.

FIG. 3 illustrates a method of detecting a target in an NLOS area by utilizing reflection characteristics of a radar, according to one or more embodiments.

In FIG. 3, it is assumed that an obstacle 23 is located on the left side of the driving direction of the vehicle 10, an obstacle 24 is located on the front left side, and a target 35 is obscured by the obstacle 23.

Referring to FIG. 3, the corner radar 12 mounted on the vehicle 10 may acquire radar data for a target 35 through a radar signal reflected by the obstacle 24.

A target detecting apparatus may detect the target 35 by acquiring radar data on the target 35 from the corner radar 12.

However, the radar data acquired by the corner radar 12 is not data of a direct radar signal, but rather is data of a radar signal reflected by the target 35 and then reflected by a reflective wall surface of the obstacle 24 back to the corner radar 12. That is, the target detecting apparatus recognizes a position of a ghost target 35' beyond the reflective wall surface, i.e., the radar may "see" the ghost target 35' on a continuous/straight line from the corner radar 12 of the vehicle 10 to the wall surface to the ghost target 35', which is actually signal reflected from a position of the actual moving target 35. Accordingly, the target detecting apparatus may detect the position of the actual moving target 35 by mirroring the recognized position of the virtual target 35' with respect to the position of the reflective wall surface that is reflecting the radar's radio waves.

The target detecting apparatus according, according to some embodiments, may use a camera installed in the vehicle 10 and/or driving speed information of the vehicle in order to more accurately detect the position of the actual moving target 35.

Figure 4:
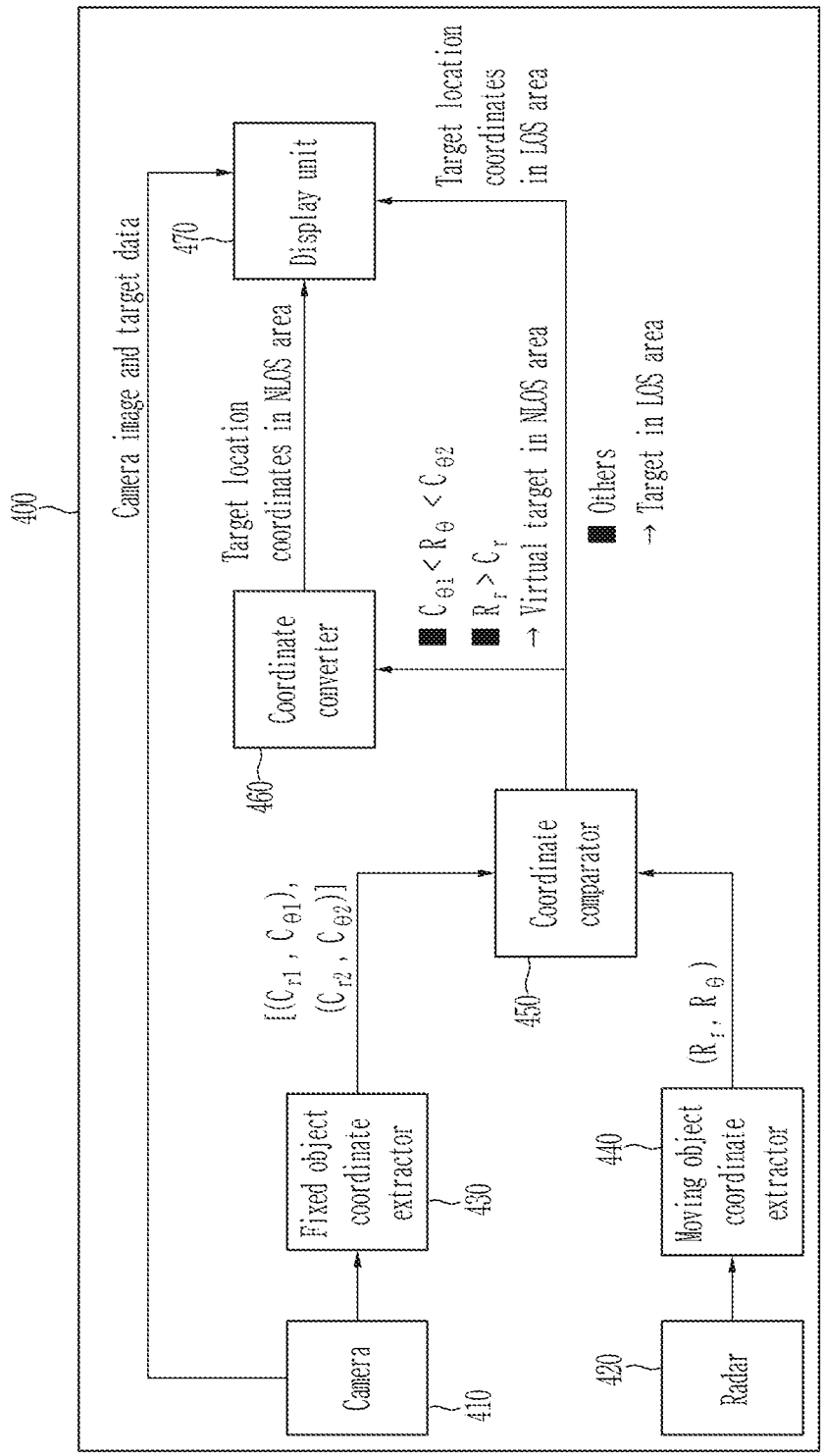
FIG. 4 illustrates a target detecting apparatus, according to one or more embodiments.
Figure 5:
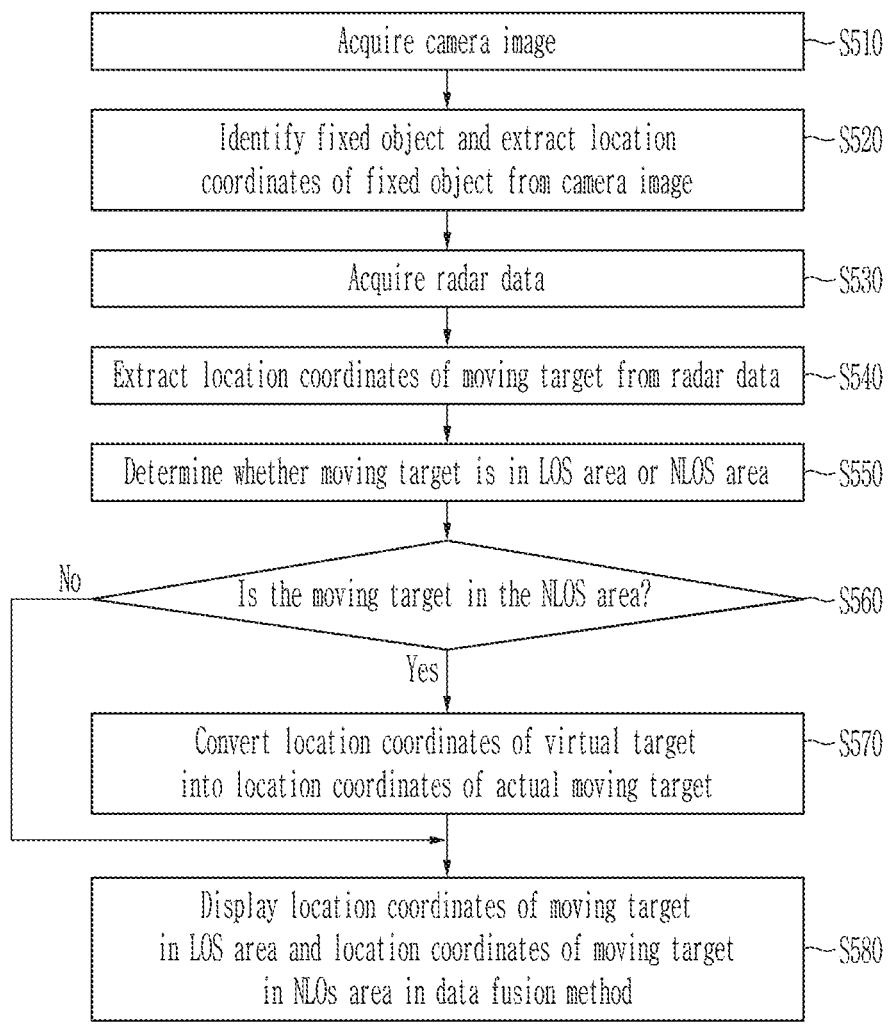
FIG. 5 illustrates a target detecting method, according to one or more embodiments.

FIG. 4 illustrates a target detecting apparatus, according to one or more embodiments, and FIG. 5 illustrates a target detecting method, according to one or more embodiments, of the target detecting apparatus illustrated in FIG. 4.

Referring to FIG. 4, a target detecting apparatus 400 may include a camera 410, at least one radar 420, a fixed object coordinate extractor 430, a moving object coordinate extractor 440, a coordinate comparator 450, and a coordinate converter 460, and a display unit 470. The target detecting apparatus 400 may be included with, or part of, a vehicle. The vehicle may be any type of moving apparatus, for example, a drone, a truck, an automobile, a train, an aircraft, etc. In some embodiments, the target detecting apparatus may be stationary device, for example, a sensor affixed to a corner post or building wall. While description below refers to a vehicle example, the same teachings are readily applied to non-vehicle applications/installations.

The camera 410 may be a camera installed in the front of the vehicle. The camera 410 has a sensing area within a certain angle (for example, an FOV 60 degrees or 90 degrees) of the front and acquires a camera image by photographing the sensing area (S510). The camera 410, or an image-processing system in communication with the camera 410, extracts target data from the photographed camera image. The target data may be extracted from the camera image through an Artificial Intelligence (AI) algorithm, for example, a convolutional neural network (CNN) model. The target data may be extracted from the camera image in various ways and is not limited to AI-based extraction. For example, an image processing pipeline may be used with various filters and algorithms for feature extraction. The extracted target data is transmitted to the fixed object coordinate extractor 430. Also, the camera image and the target data may be transmitted to the display unit 470.

The fixed object coordinate extractor 430 identifies a fixed object, that is, an object without motion, from the target data extracted from the camera image, and extracts location coordinates of the fixed object (S520). Regarding modeling relevant scene geometry, reference may be made to FIG. 6, where a frame of reference's origin is at the vehicle, where "C" variables relate to the obstacle, and where "R" variables relate to the reflected/virtual target. Using such modeling, the location coordinates of the fixed object may be represented by points angle-distance format, where a point may be represented as (i) a distance or range ($C_r$) to a point of the identified fixed object, and (ii) a left (−)/right (+) angle ($C_\theta$), i.e., a bearing, with respect to the center O (origin) of the camera 410 (or vehicle). Since the fixed object has a predetermined area or geometry, the fixed object coordinate extractor 430 may extract, as the location coordinates of the fixed object, a first point of the fixed object (the distance and angle ($C_{r1}$, $C_{\theta1}$)) to the right end point of the fixed object, and a second point of the fixed object (the distance and angle ($C_{r2}$, $C_{\theta2}$)) to the left end point of the fixed object as recognized within the sensing area of the camera 410. The location coordinates of the fixed object may be represented as X and Y coordinates instead; any coordinate system may be used, including a three-dimensional coordinate system.

At least one radar sensor 420 of a radar system may transmit a radar signal from an installed location to a set sensing area and receive a radar signal reflected and returned from an object. The system of the radar sensor 420 acquires radar data, which is information about the transmitted radar signal and about the received radar signal (S530). The radar system transmits the radar data to the moving object coordinate extractor 440. Although only one radar sensor 420 is illustrated in FIG. 4, the techniques described herein may be applied to any radar sensors mounted on any part or side of a vehicle (and their accompanying radar systems).

The moving object coordinate extractor 440 extracts the location coordinates of the moving target from the radar data received from the radar system of the radar sensor 420 (S540). The moving object coordinate extractor 440 may extract the distance and angle of the moving target and use the extracted distance and angle as the location coordinates of the moving target, for example, ($R_r$, $R_\theta$), where $R_r$ is the reflected range from the radar sensor 420 to the moving target, and where $R_\theta$ is the reflected angle/bearing to the moving target. In other words, due to reflection, the extracted coordinates ($R_r$, $R_\theta$) of the moving target are, in the coordinate system, at a location corresponding to a reflection of the actual moving target, i.e., the location of the virtual moving target 35'. In some embodiments, the moving target may first be isolated for reflection processing by determining, from the radar data (including possible previous/recent radar data and/or doppler effect data) that the target is in motion and is not part of the fixed scenery.

The coordinate comparator 450 receives the camera-based location coordinates (($C_{r1}$, $C_{\theta1}$), ($C_{r2}$, $C_{\theta2}$)) of the fixed object and the radar-based location coordinates ($R_r$, $R_\theta$) of the moving object and compares the two to determine whether the moving target detected from the radar data is in the LOS area or the NLOS area (of the radar). That is, the coordinate comparator 450 may compare the distances and angles of points [($C_{r1}$, $C_{\theta1}$), ($C_{r2}$, $C_{\theta2}$)] of the fixed object (extracted from the camera image) with the distance and angle ($R_r$, $R_\theta$) of the moving target extracted from the radar data, and determine whether the moving target detected from the radar data is in the LOS area or in the NLOS area of the radar sensor 420. More specifically, when the condition of Equation 1 is satisfied, the coordinate comparator 450 may determine that the moving target detected from the radar data is in the NLOS area.

$$C_{\theta1} < R_\theta < C_{\theta2}, \text{ and } R_r > C_r \qquad \text{Equation 1}$$

Regarding $C_r$, consider, in the coordinate system originated at the vehicle/camera, a ray cast from the location of the radar sensor 420 to the location of the reflected radar data of the moving target 35 (i.e., a ray cast to the location of the virtual moving target 35'). Such a ray, from the location of the radar sensor 420 to the location of the virtual target 35', may intersect a line defined by the location coordinates of the fixed object 24. That is, there may be a point of intersection between (i) a line segment of the reflective surface connecting the location coordinates ($C_{r1}$, $C_{\theta1}$) and ($C_{r2}$, $C_{\theta2}$) of the fixed object and, (ii) a line from the center of the radar 420 to the location coordinates ($R_r$, $R_\theta$) of the moving target. That point of intersection may have a distance ($C_r$) from the vehicle/origin to the aforementioned intersection point. The distance $C_r$ may be readily determined from the known location coordinates.

As expressed in Equation 1, when the bearing or angle ($R_\theta$) of the moving target's reflected radar image (the angle/bearing to the virtual target 35') is between the bearing or angle ($C_{\theta 1}$) to the right end point of the fixed object and the bearing or angle ($C_{\theta 2}$) to the left end point of the fixed object, and when the distance ($R_r$) from the vehicle/camera to the radar reflection of the moving target (the virtual moving target 35') is greater than the distance ($C_r$) from the vehicle/camera to the aforementioned intersection point (of the reflective surface's line segment and the ray from the sensor 420 to the virtual target 35'), the coordinate comparator 450 recognizes that the moving target detected from the radar data is located in an area beyond the reflective wall surface of the fixed object, and determines that the moving target is a virtual target. That is, the coordinate comparator 450 may determine that the actual moving target is in the NLOS area. Although mention is made herein of determining whether a target object is in an LOS area or an NLOS area, this is just a convenient expression of the underlying problem. In practice, there may not be an explicit determination to that effect. Rather, in practice, a determination is made about the relative positions of the fixed object (or a surface thereof) and the radar-indicated location of the moving target, and subsequent actions may be taken on that basis. Therefore, mention of determining whether a moving target is in an NOS or NLOS area should be taken as meaning determining a geometric condition with respect to radar-based location data of the moving target and camera-based location data of a fixed object (the geometric condition corresponding to a reflection scenario, i.e., an NLOS scenario).

When it is determined that the moving target is in the NLOS area, the currently extracted radar-based location coordinates of the moving target may be treated as the location coordinates of a virtual target corresponding to the moving target. When it is determined that the moving target is in the NLOS area (S560), the location coordinates ($R_r$, $R_\theta$) of the virtual target may be converted into the location coordinates of the actual moving target. To do so, the coordinate comparator 450 transmits the location coordinates ($R_r$, $R_\theta$) of the virtual target and the fixed object coordinates (($C_{r1}$, $C_{\theta 1}$), ($C_{r2}$, $C_{\theta 2}$)) to the coordinate converter 460.

The coordinate converter 460 converts the location coordinates ($R_r$, $R_\theta$) of the virtual target into the location coordinates of the actual moving target (S570). Specifically, the coordinate converter 460 may extract a virtual reflective surface line segment from the location coordinates (($C_{r1}$, $C_{\theta 1}$), ($C_{r2}$, $C_{\theta 2}$)) of the fixed object on the reflective wall surface, and convert the location coordinates ($R_r$, $R_\theta$) of the virtual target into the location coordinates of the actual moving target by mirroring the location coordinates of the virtual target with respect to the line segment of the reflective surface as defined by the location coordinates of the fixed object. The coordinate converter 460 may extract a reflective surface line segment by connecting the location coordinates ($C_{r1}$, $C_{\theta 1}$) of the right end point and the location coordinates ($C_{r2}$, $C_{\theta 2}$) of the left end point of the fixed object.

When, at step 560, the condition of Equation 1 is not satisfied, the coordinate comparator 450 determines that the corresponding moving target is in the LOS area. When the coordinate comparator 450 determines that the moving target is in the LOS area, the location coordinates of the moving target are transmitted to the display unit 470 without reflection conversion.

The display unit 470 may display the target data on the camera image. For example, the display unit 470 may display information corresponding to or based on the location coordinates of the moving target, whether in the LOS area or the NLOS area, in a data fusion method (S580). The data fusion method can be defined as a process of merging or processing different data or data of different types. In addition, the display unit 470 may notify the driver and/or the vehicle autonomous driving system of the presence or absence of a moving target in the NLOS area, to enable the driver and/or the vehicle autonomous driving system to cope with an unexpected situation that may occur from the moving target in the NLOS area, i.e., from the moving target being out of sight of the camera and likely out of sight of the driver.

Figure 6:
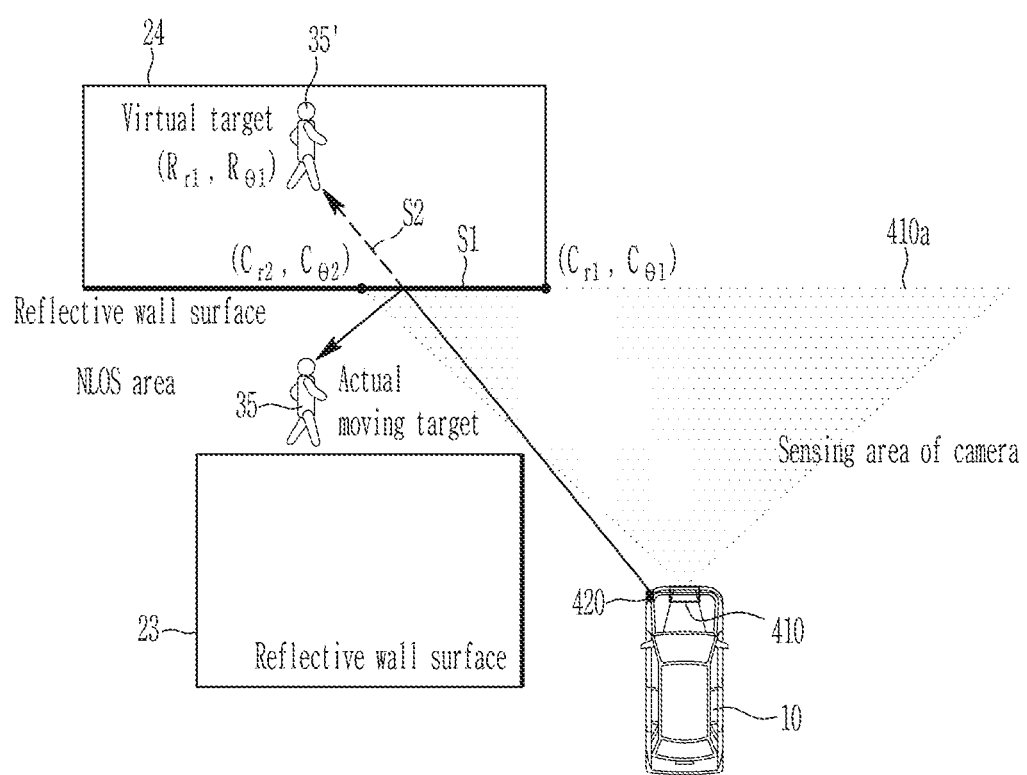
FIG. 6 illustrates an example of target detecting, according to one or more embodiments.

FIG. 6 *i* illustrates an example target detecting method, according to one or more embodiments.

In FIG. 6, as in FIG. 3, it is assumed that the obstacle 23 is located on the left side in the driving direction of the vehicle 10, the obstacle 24 is located on the front left side in the driving direction of the vehicle 10, and the moving target 35 is obscured by the obstacle 23. In this case, the obstacles 23 and 24 become fixed objects, and hereinafter, for convenience, the term the fixed object may be used instead of an obstacle.

The fixed object coordinate extractor 430 of the target detecting apparatus 400 identifies the fixed object 24 in the camera image and extracts the location coordinates of the fixed object 24 from the camera (more than one image, and/or video, may be used). The fixed object coordinate extractor 430 extracts distance and angle coordinates to the fixed object 24, which are location coordinates of the fixed object 24 in the form of distance and bearing/angle ($C_r$, $C_\theta$). In this case, the fixed object coordinate extractor 430 may extract the distance and angle ($C_{r1}$, $C_{\theta 1}$) to the right end point of the fixed object 24 and the distance and angle ($C_{r2}$, $C_{\theta 2}$) to the left end point of the fixed object 24 (which is recognized within the sensing area 410*a* of the camera 410).

Next, the moving object coordinate extractor 440 of the target detecting apparatus 400 extracts a distance and angle ($R_{r1}$, $R_{\theta 1}$) of the location coordinates of the reflected radar image of the moving target, i.e., the location coordinates of the moving target as seen by the radar data acquired by the radar 420.

The coordinate comparator 450 determines whether the moving target detected from the radar data is in the LOS area or in the NLOS area by using the distances and angles (($C_{r1}$, $C_{\theta 1}$), ($C_{r2}$, $C_{\theta 2}$)) of the fixed object and the distance and angle ($R_{r1}$, $R_{\theta 1}$) of the moving target.

Referring to FIG. 6, since the reflective wall surface of the fixed object 24 where the signal is reflected has a predetermined area (a known geometry), the fixed object coordinate extractor 430 may extract the distance and angle ($C_{r1}$, $C_{\theta 1}$) from the radar sensor 420 (or vehicle, or camera, or origin) to the right end point of the fixed object 24 and the distance and angle ($C_{r2}$, $C_{\theta 2}$) to the left end point recognized within the sensing area 410*a* of the camera 410 from the target data extracted from the camera image. In this case, a virtual reflective surface line segment S1 connecting the right end point and the left end point of the fixed object 24 may be extracted. The use of a line of the fixed object 24 is only an example. In some embodiments, image data may be used for three-dimensional (3D) scene reconstruction and a reconstructed 3D model of the scene may be used, in which case a reflective surface may represented in the model and 3D geometry may be used to determine whether a reflection scenario exists and whether location conversion (for reflection) is to be used. The use of a line can be readily extended to other geometric representations and corresponding tests for inferring that a location of a moving target is a reflected location. For example, a 3D location of the reflected location of the moving target may be compared to a 3D plane of the fixed object.

In addition, a target line segment S2 from the center of the radar 420 to the distance and angle ($R_{r1}$, $R_{\theta1}$) of the reflection of the moving target extracted from the radar data may be extracted.

When the target line segment S2 crosses the virtual reflective surface line segment S1, the coordinate comparator 450 may make a determination corresponding to the moving target detected from the radar data being in the NLOS area. In this case, whether or not the target line segment S2 intersects the virtual reflective surface line segment S1 may be determined from the condition of Equation 1, or any other condition that can indicate that a moving target is detected in radar data and yet the radar-based location of the moving target is "within" or "beyond" a fixed object detected in an image. When the condition of Equation 1, for example, is satisfied, the coordinate comparator 450 may determine that the moving target detected from the radar data is in the NLOS area.

The fact that the moving target is in the NLOS area means that the radar data acquired by the radar 420 is not data from a direct radar signal, but instead is data from the radar signal as reflected by the reflective wall surface of the fixed object 24. Therefore, the distance and angle ($R_{r1}$, $R_{\theta1}$) of the moving target extracted by the moving object coordinate extractor 440 is location coordinates of a ghost or virtual target 35' beyond the wall surface on a continuous line between the radar 420 and the reflective wall surface based on the reflective wall surface of the fixed object where the signal is reflected.

Therefore, when the condition of Equation 1 is satisfied, for example, since it may be recognized that the moving target exists in the area beyond the wall surface of the fixed object 24, the coordinate comparator 450 may recognize that the moving target extracted from the radar data is a virtual target 35' and determine that the actual moving target 35 is in the NLOS area.

When it is determined that the actual moving target 35 is in the NLOS area, the coordinate converter 460 calculates the location coordinates of the actual moving target 35 by mirroring the location coordinates ($R_{r1}$, $R_{\theta1}$) of the virtual target 35' based on the location coordinates of the reflective surface line segment S1, thereby calculating the position of the actual moving target 35 in the NLOS area.

Figure 7:
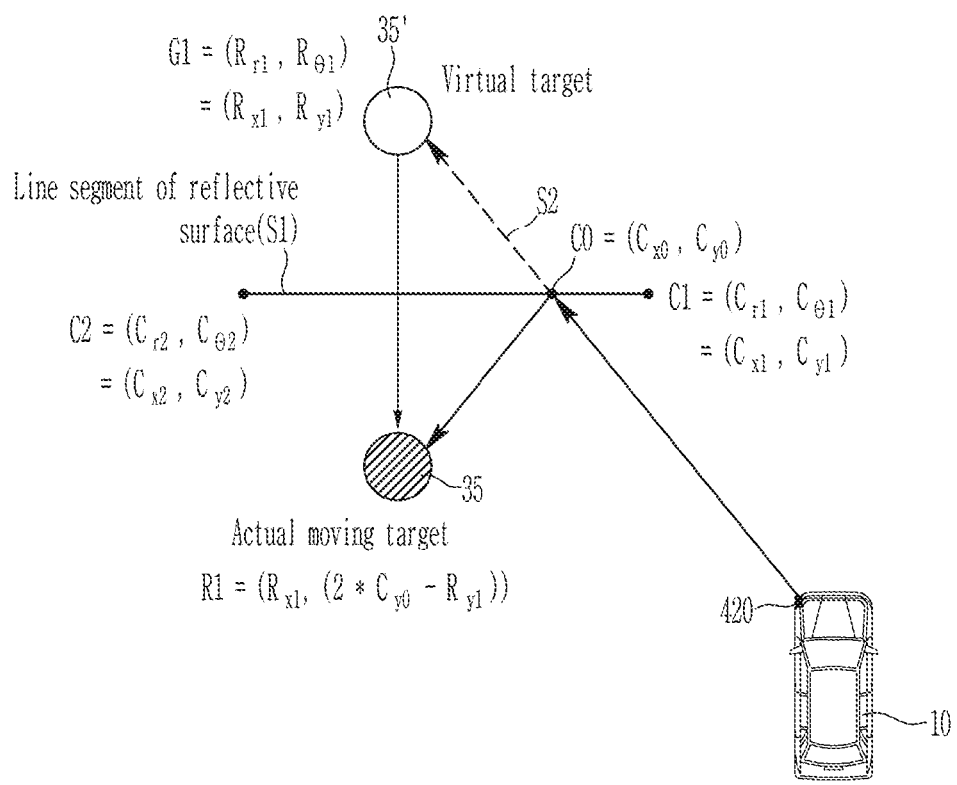
FIG. 7 illustrates an example of conversion of location coordinates of a virtual moving target into location coordinates of an actual moving target, according to one or more embodiments.

FIG. 7 illustrates an example of conversion of location coordinates of a virtual target into location coordinates of an actual moving target, according to one or more embodiments. The conversion may be performed, for example, by a coordinate converter as illustrated in FIG. 4.

Referring to FIG. 7, it is assumed that the virtual horizontal reflective surface line segment S1 is extracted by connecting the right end point and the left end point of the fixed object recognized within the sensing area of the camera 410.

The target line segment S2 from the center of the radar 420 of the vehicle 10 to the distance and angle ($R_{r1}$, $R_{\theta1}$) of the moving target extracted from the radar data may be extracted.

The location coordinates expressed by the distance and angle of the right end point are ($C_{r1}$, $C_{\theta1}$), and the location coordinates expressed by the distance and angle of the left end point are ($C_{r2}$, $C_{\theta2}$). In this case, since the distance and angle ($R_{r1}$, $R_{\theta1}$), or, the location coordinates, of the moving target, satisfy the condition of Equation 1, the moving target extracted from the radar data is classified as the virtual target 35', and the actual moving target 35 is determined to be in the NLOS area.

Accordingly, the coordinate converter 460 converts the distance and angle ($R_{r1}$, $R_{\theta1}$), which are the location coordinates (G1) of the virtual target 35', into X and Y coordinates ($R_{x1}$, $R_{y1}$), and calculates X and Y coordinates of the actual moving target 35 by performing mirroring based on the reflective surface line segment S1. The X, Y coordinates of the actual moving target may be calculated as in Equation 2.

$$R1 = (R_{x1}, (2 \cdot C_{y0} - R_{y1})) \quad \text{Equation 2}$$

In Equation 2, R1 denotes the X and Y coordinates of the actual moving target, and $C_{y0}$ denotes the Y coordinate of the intersection point Co of the reflective surface line segment S1 and the target line segment S2.

In this way, when the reflective surface line segment S1 is a horizontal line segment, the X coordinates of the virtual target 35' and the actual moving target 35 are maintained as they are, and the Y coordinate of the actual moving target 35 may be calculated by a combination of the Y-coordinate component of the reflective surface line segment S1 and the Y-coordinate component of the virtual target 35'.

Figure 8:
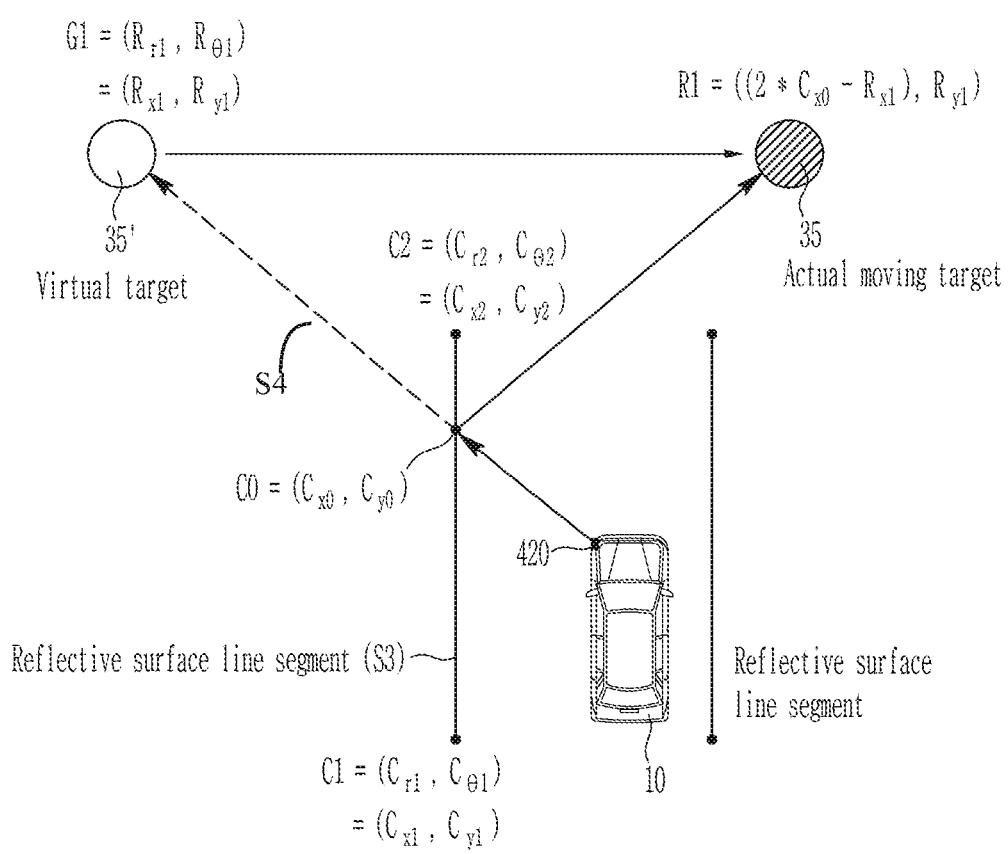
FIG. 8 illustrates another example of conversion of location coordinates of a virtual moving target into location coordinates of an actual moving target, according to one or more embodiments.

FIG. 8 illustrates another example of conversion of location coordinates of a virtual target into location coordinates of an actual moving target. Coordinate conversion may be performed the coordinate converter illustrated in FIG. 4.

Referring to FIG. 8, it is assumed that when a radar signal is reflected by a fixed object located to the side of a vehicle, a virtual vertical reflective surface line segment S3 is created by connecting the lower end point and the upper end point of the fixed object recognized within the sensing area of the camera 410. Unlike FIG. 7, when a radar signal is reflected by a fixed object located to the side, a reflective surface line may be a segment that is a vertical line segment, e.g., S3 as shown in FIG. 8.

A target line segment S4 may be extracted from the center of the radar 420 of the vehicle 10 to the distance and angle ($R_{r1}$, $R_{\theta1}$) of the reflected moving target extracted from the radar data.

The location coordinates expressed by the distance and angle of the lower end point are ($C_{r1}$, $C_{\theta1}$), and the location coordinates expressed by the distance and angle of the upper end point are ($C_{r2}$, $C_{\theta2}$). In this case, since the distance and angle ($R_{r1}$, $R_{\theta1}$), which are the location coordinates of the moving target, satisfy the condition of Equation 1, the moving target extracted from the radar data is classified as the virtual target 35', and the actual moving target 35 is determined to be in the NLOS area.

The coordinate converter 460 converts the distance and angle ($R_{r1}$, $R_{\theta1}$), which are the location coordinates of the virtual target 35', into X, Y coordinates ($R_{x1}$, $R_{y1}$), and performs mirroring based on the reflective surface line segment S3 to calculate the X, Y coordinates of the actual target. The X, Y coordinates of the actual moving target may be calculated as in Equation 3.

$$R1 = ((2 \cdot C_{x0} - R_{x1}), R_{y1}) \quad \text{Equation 3}$$

In Equation 3, R1 denotes the X and Y coordinates of the actual target, and $C_{x0}$ denotes the X coordinate of the intersection point Co of the reflective surface line segment S3 and the target line segment S4.

In this way, when the reflective surface line segment S3 is a vertical line segment, the Y coordinates of the virtual target 35' and the actual moving target 35 are maintained, and the X coordinate component of the reflective surface line segment S3 and the X coordinate component of the virtual target 35' are combined, so that the true X-axis coordinate of the actual moving target 35 may be calculated.

Figure 9:
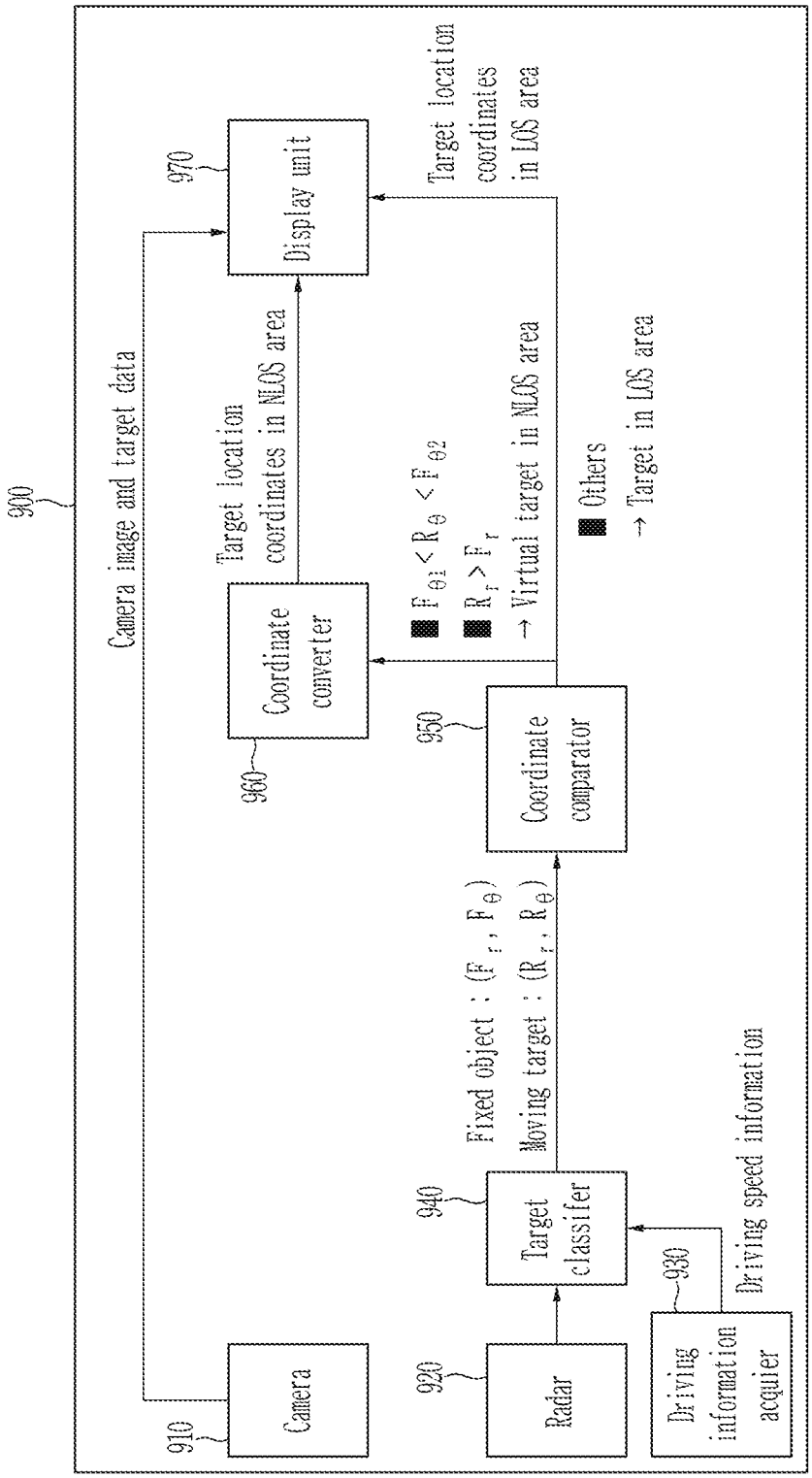
FIG. 9 illustrates a target detecting apparatus, according to one or more embodiments.
Figure 10:
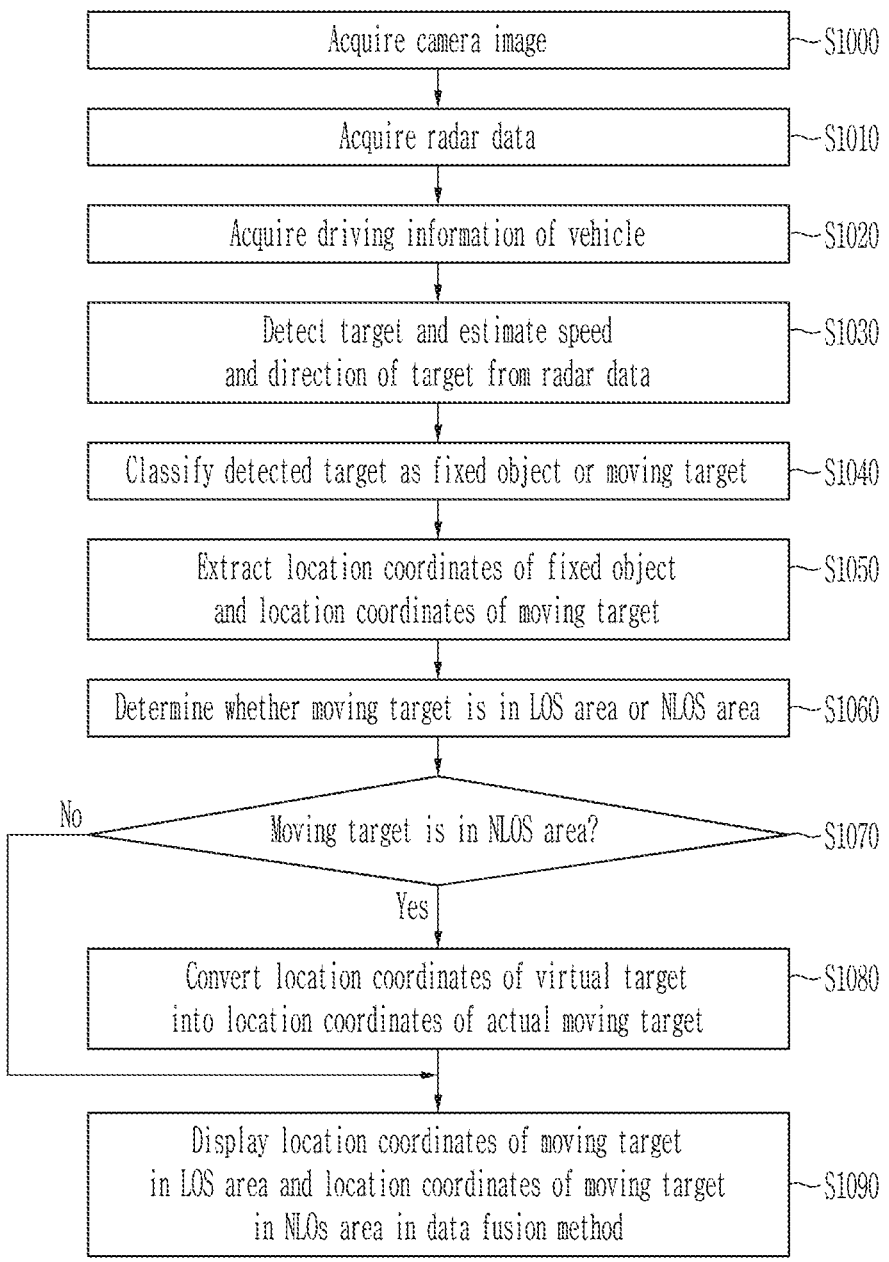
FIG. 10 illustrates a target detecting method, according to one or more embodiments.

FIG. 9 illustrates a target detecting apparatus according to one or more embodiments, and FIG. 10 illustrates a target detecting method of the target detecting apparatus illustrated in FIG. 9.

Referring to FIG. 9, unlike the target detecting apparatus 400, a target detecting apparatus 900 distinguishes a fixed object from at least one target detected by a radar by using driving speed information of the vehicle and calculates location coordinates of the moving target.

The target detecting apparatus 900 includes a camera 910, a radar 920, a driving information acquirer 930, a target classifier 940, a coordinate comparator 950, a coordinate converter 960, and a display unit 970.

Referring to FIGS. 9 and 10, the camera 910 may acquire a camera image by photographing a sensing area (S1000), and may extract target data from the camera image through an AI algorithm. The camera image and the extracted target data may be transmitted to the display unit 970.

The radar 920 may transmit a radar signal from an installed location to a set sensing area and receive a radar signal reflected and returned from an object. The radar 920 acquires radar data, which is information about the transmitted radar signal and the received radar signal (S1010), and transmits the radar data to the target classifier 940.

The driving information acquirer 930 acquires driving information of the vehicle (S1020) and transmits driving speed information among the driving information to the target classifier 940.

The target classifier 940 detects a target (or multiple) from radar data and estimates the speed and direction of the at least one detected target (S1030).

The target classifier 940 classifies the target detected from the radar data as a fixed object or a moving target by using the detected speed and direction of the target and using the vehicle driving speed information (S1040).

When the vehicle is traveling in a determined direction, in the case of a target that is a fixed object, the speed and the direction thereof estimated from the radar data will be the same as the driving speed of the vehicle and opposite to the direction of the vehicle. On the other hand, in the case of a target that is a moving object, the speed of the moving object estimated from the radar data is different from the driving speed of the vehicle. By using this point, it is possible to classify the target detected from the radar data as a fixed object or a moving target by comparing the speed and direction of the at least one target detected from the radar data with the driving speed and driving direction of the vehicle. Accordingly, the target classifier 940 compares the speed of the target estimated from the radar data with the driving speed of the vehicle in the driving direction of the vehicle. When the speed of the target in the driving direction of the vehicle is the same as the speed of the vehicle, the target is classified as a fixed object. When the speed of the target is different from the driving speed of the vehicle, the target classifier 940 classifies the corresponding target as a moving target.

Next, the target classifier 940 extracts the distance and angle ($F_r$, $F_\theta$), which are the location coordinates of the fixed object, from the radar data, and extracts the distance and angle ($R_r$, $R_\theta$) of the moving target, which are the location coordinates of the moving target. (S1050). Since the fixed object has a predetermined area, the distance and angle ($F_r$, $F_\theta$), which are the location coordinates of the fixed object, may include the distance and angle ($F_{r1}$, $F_{\theta1}$) to the right end point of the fixed object and the distance and the distance ad angle ($F_{r2}$, $F_{\theta2}$) to the left end point of the fixed object.

The distance and angle of the fixed object (($F_{r1}$, $F_{\theta1}$), ($F_{r2}$, $F_{\theta2}$)) and the distance and angle ($R_r$, $R_\theta$) of the moving target are transmitted to the coordinate comparator 950.

The coordinate comparator 950 compares the distance and angle ($R_r$, $R_\theta$) of the moving target based on the distance and angle [($F_{r1}$, $F_{\theta1}$), ($F_{r2}$, $F_{\theta2}$)] of the fixed object to determine whether the moving target is in the LOS area or in the NLOS (S1060). When the condition of Equation 4 is satisfied, the coordinate comparator 950 may determine that the moving target detected from the radar data is in the NLOS area.

$$F_{\theta1} < R_\theta < F_{\theta2}, R_r > F_r \qquad \text{Equation 4}$$

In Equation 4, $F_r$ represents the distance, in the location coordinates, between (i) the intersection point of the line segment of the reflective surface connecting the location coordinates ($F_{r1}$, $F_{\theta1}$) of the right end point of the fixed object and the location coordinates ($F_{r2}$, $F_{\theta2}$) of the left end point of the fixed object and (ii) the target line segment defined by the center of the radar 420 and the radar-based location coordinates ($R_r$, $R_\theta$) of the moving target.

In Equation 4, a first condition is that the angle ($R_\theta$) of the moving target is between the angle ($F_{\theta1}$) to the right end point of the fixed object and the angle ($F_{\theta2}$) to the left end point of the fixed object, and a second condition is that the distance ($F_r$) of the moving target is longer than the distance ($F_r$) of the intersection point of the two line segments. When both conditions are met, the coordinate comparator 950 recognizes that the moving target detected from the radar data is in an area beyond the reflective wall surface of the fixed object, and determines the moving target as a virtual target. That is, the coordinate comparator 950 may determine that the actual moving target is in the NLOS area. As noted above, an explicit determination about the NLOS status is not necessarily made, rather, such status is inferred from the spatial relationship of the radar-based moving object location and the image-based fixed object, and when such a condition (as in Equation 4) corresponding to a NLOS position is met, the location of the moving target object may be converted.

When it is determined that the moving target's location corresponds to the NLOS area (or a radar image reflected from a fixed object), the location coordinates of the currently extracted moving target are treated as the location coordinates of the virtual target (ghost target). Therefore, when it is determined that the moving target is in the NLOS area (S1070), in order to convert the location coordinates ($R_r$, $R_\theta$) of the virtual target into the location coordinates of the actual moving target, the coordinate comparator 950 transmits the location coordinates ($R_r$, $R_\theta$) of the virtual target and the location coordinates ($F_{r1}$, $F_{\theta1}$), ($F_{r2}$, $F_{\theta2}$) of the fixed object to the coordinate converter 960.

The coordinate converter 960 converts the location coordinates ($R_r$, $R_\theta$) of the virtual target into the location coordinates of the actual moving target (S1080). The coordinate converter 960 may extract a virtual reflective surface line segment from the location coordinates (($F_{r1}$, $F_{\theta1}$), ($F_{r2}$, $F_{\theta2}$)) of the fixed object on the reflective wall surface, and convert the location coordinates ($R_r$, $R_\theta$) of the virtual target into the location coordinates of the actual moving target by mirroring the location coordinates of the virtual target based on the location coordinates of the line segment of the reflective surface. The coordinate converter 960 may convert the location coordinates ($R_r$, $R_\theta$) of the virtual target into the location coordinates of the actual moving target through the method described with reference to FIGS. 7 and 8.

When the condition of Equation 4 is not satisfied, the coordinate comparator 950 determines that the corresponding moving target is in the LOS area. When the coordinate comparator 950 determines that the moving target is in the LOS area, the location coordinates of the moving target are transmitted to the display unit 970 without conversion.

The display unit 970 displays a camera image and information about the target (target data) superimposed on the displayed camera image. The display unit 970 displays the location coordinates (or some information/graphic based thereon) of the target in the LOS area or in the NLOS area, as the case may be, in a data fusion method (S1090). In addition, the display unit 970 notifies the driver or the vehicle autonomous driving system of the presence or absence of a moving target in the NLOS area, to enable the driver or the vehicle autonomous driving system to cope with an unexpected situation that may occur from the moving target in the NLOS area. For example, the display unit may display a representation of the moving target superimposed on image data of fixed object that it is obscured by, possibly with a graphic effect (e.g., lightened, alpha-blended, colored, highlighted, etc.) to distinguish the obscured NLOS object from LOS objects.

In the above embodiment, for convenience, the method of detecting a moving target based on radar data acquired from one radar 420 or 920 and calculating the location coordinates of the moving target has been described, but the moving target may be detected by equally applying the foregoing method to radar data acquired from radars installed at different locations of the vehicle.

In this way, by using the radar data of the radars installed at the different locations of the vehicle, a target may be detected by collecting the radar data of the different radars, and the targets detected from the radar data of the different radars may be compared. In this way, even when a target is not detected by one radar, target data may be secured in another radar, so that the target recognition rate in the NLOS area may be improved.

The geometric modeling and geometry conditions described above are, for explanation, reduced to simple examples and implementations. However, the underlying concept may be extended to many methods of modeling and condition testing. For example, although buildings and the like often have a rectilinear arrangement, for example, in the grid layout common in urban areas, it will be appreciated that testing for a target object that has a reflected radar image can be performed for any orientation of fixed objects. Moreover, it will be appreciated that the notion of NLOS for a target object is not a strict requirement. For example, in some cases a target object may be in a LOS area of a camera and yet not be in the LOS area of a radar. The role of the camera (or cameras) may be to identify the reflected radar image phenomena.

It will also be appreciated that the use of a camera is not required. For example, if a vehicle location is known, and if there is a pre-existing model of the area near the vehicle, it may be possible to obtain information about fixed objects (including locations and line segments thereof) without using a camera.

Figure 11:
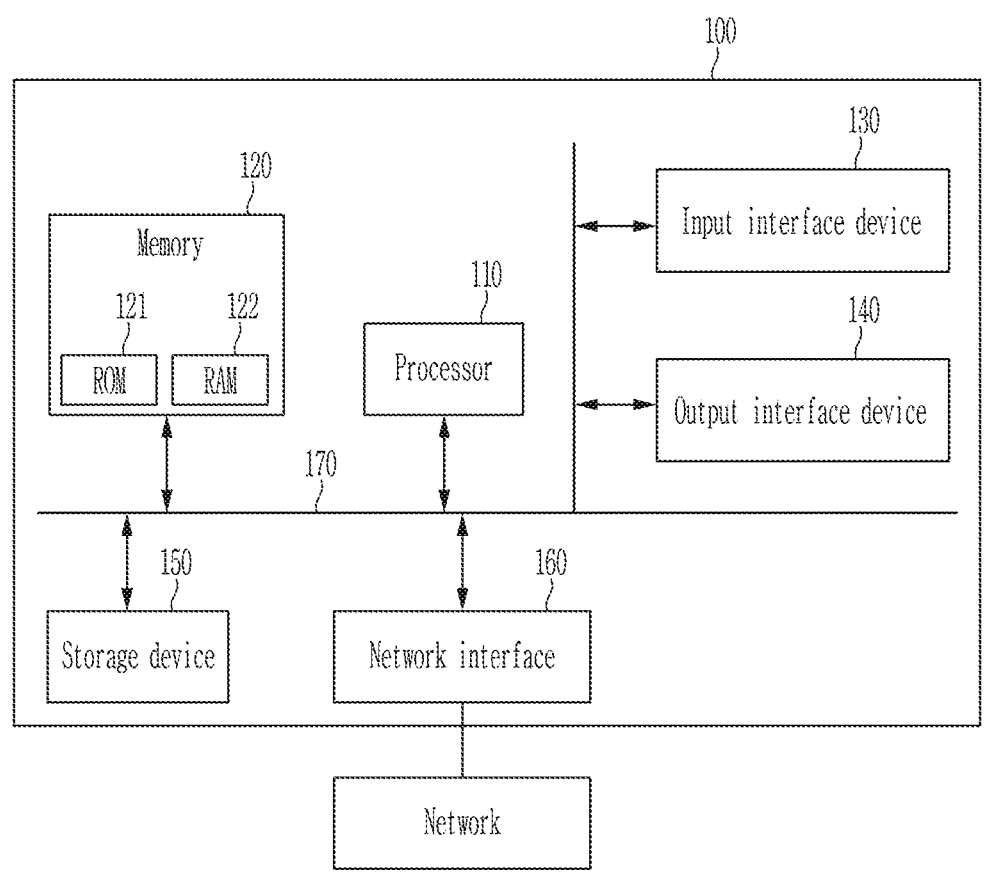
FIG. 11 illustrates a target detecting apparatus.

FIG. 11 illustrates a target detecting apparatus, according to one or more embodiments.

Referring to FIG. 11, the target detecting apparatus 100 may be a computing device in which target detecting methods described above are implemented.

The target detecting apparatus 100 may include a processor 110, a memory 120, an input interface device 130, an output interface device 140, a storage device 150, and a network interface device 160. The respective components may be connected by a common bus 170 to communicate with each other. In addition, each of the components may be connected through individual interfaces or individual buses based on the processor 110 instead of the common bus 170.

The processor 110, or processing hardware, may be implemented in various types, such as an Application Processor (AP), a Central Processing Unit (CPU), a Graphic Processing Unit (GPU), a Neuromorphic Processing Unit (NPU), and the like, and possibly as combinations of different processors. The processor 110 may be a semiconductor device executing commands stored in the memory 120 or the storage device 150. The processor 110 may execute a program command stored in at least one of the memory 120 and the storage device 150. The processor 110 may store a program command (in the form of processor instructions) for implementing at least some of the functions of the fixed object coordinate extractor 430, the moving object coordinate extractor 440, the coordinate comparator 450, the coordinate converter 460, and the display unit 470 described in FIG. 4 in the memory 120, to control the operation described with reference to FIGS. 4 to 8 to be performed. Further, the processor 110 may store a program command (instructions) for implementing at least some of the functions of the driving information acquirer 930, the target classifier 940, the coordinate comparator 950, the coordinate converter 960, and the display unit 970 described in FIG. 9 in the memory 120, to control the operation described with reference to FIGS. 7 to 9 to be performed.

It will also be noted that the various units described, e.g., converters, classifiers, extractors, etc., are convenient divisions of functionality. The functionality described herein may be implemented in many different architectures, i.e., with different modules having different (and more or less) functionality and possibly communicating in different sequences.

The memory 120 and the storage device 150 may include various types of volatile or non-volatile storage media. For example, the memory 120 may include a Read-Only Memory (ROM) 121 and a Random Access Memory (RAM) 122. The memory 120 may be located inside or outside the processor 110, and the memory 120 may be connected to the processor 110 through various known means.

The input interface device 130 is configured to provide input data to processor 110. The input interface device 130 is configured to provide collected data to processor 110.

The output interface device 140 is configured to output data from processor 110.

The network interface device 160 may transmit or receive a signal with an external device through a wired network or a wireless network.

At least a part of the target detecting method according to exemplary embodiment of the present disclosure may be implemented as a processor instructions executed on a computing device, such instructions, collectively forming a program product or a software product, may be stored in a computer-readable medium which is not a signal per se).

In addition, at least a part of the target detecting method according to the exemplary embodiment of the present disclosure may be implemented as hardware that can be electrically connected to a computing device.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of detecting a moving target, the method comprising:
   acquiring radar data from at least one radar installed in a vehicle;
   extracting a location coordinate of the moving target from the radar data;
   obtaining a line segment of a reflective surface on which a signal of the radar is reflected by using a location coordinate of a first end point of a fixed object located within a sensing range of the radar and a location coordinate of a second end point of the;
   determining whether the moving target is in an area corresponding to a Non Line of Sight (NLOS) area of the radar based on the location coordinates of the moving target and the line segment of the reflective surface; and
   converting the location coordinates of the moving target into actual location coordinates corresponding to an actual location of the moving target based on a determination that the moving target is in the area corresponding to the NLOS area of the radar,
   wherein the location coordinate includes a distance and an angle, and
   the determining whether the moving target is in an area corresponding to an NLOS area of the radar includes:
   obtaining a location coordinate of an intersection point between a target line segment from a location corresponding to a center of the radar and the line segment of the reflective surface;
   determining that the moving target is in the NLOS area when the angle of the moving target is positioned between the angle of the first end point and the angle of the second end point of the fixed object, and the distance of the moving target is greater than the distance of the intersection point.

2. The method of claim 1, wherein: the obtaining of the line segment of the reflective surface includes extracting location coordinates of the fixed object from a camera image acquired through a camera installed in the vehicle.

3. The method of claim 2, wherein the obtaining of the line segment of the reflective surface further includes:
   extracting the location coordinate of the first end point of the fixed object and the location coordinate of the second end point of the fixed object recognized within a sensing area of the camera, based on the camera image; and
   defining the line segment of the reflective surface based on the location coordinate of the first end point and the location coordinate of the second end point.

4. The method of claim 1, wherein the obtaining of the line segment of the reflective surface includes:
   acquiring a driving direction of the vehicle and a driving speed of the vehicle;
   distinguishing the fixed object from at least one target detected from the radar data by using the driving direction of the vehicle and the driving speed of the vehicle; and
   extracting location coordinates of the fixed object from the radar data.

5. The method of claim 4, wherein the distinguishing includes:
   estimating a speed of at least a first target and a second target from the radar data;
   classifying the first target as the fixed object based on the first target having a same speed as the driving speed of the vehicle in the driving direction of the vehicle; and
   classifying the second target as the moving target based on the second target not having a same direction and the same speed as the driving direction of the vehicle and the driving speed of the vehicle.

6. The method of claim 4, wherein the obtaining of the line segment of the reflective surface further includes:
   extracting the location coordinate of the first end point of the fixed object and the location coordinate of the second end point of the fixed object from the radar data; and
   defining the line segment of the reflective surface based on the location coordinate of the first end point and the location coordinate of the second end point.

7. The method of claim 1, wherein the converting includes calculating the actual location coordinates by mirroring the location coordinates of the moving target relative to the line segment of the reflective surface.

8. An apparatus for detecting a target, the apparatus comprising:
   a radar installed in a vehicle and configured to acquire radar data;
   one or more processors;
   memory storing instructions configured to, when executed by the one or more processors, cause the one or more processors to:
      determine whether a moving target is in an area corresponding to a Non Line of Sight (NLOS) area of the radar by using a location coordinate of a first end point of a fixed object located within a sensing range of the radar and a location coordinate of a second end point of the fixed object and a location coordinate of the moving target extracted from the radar data; and
      convert the location coordinates of the moving target into actual location coordinates when the moving target is determined to be in the area corresponding to the NLOS area,
   wherein the location coordinate includes a distance and an angle, and
   the instructions are further configured to cause the one or more processors to:
      define a line segment of a reflective surface on which a signal of the radar is reflected based on the location coordinate of the first end point of the fixed object and the location coordinate of the second point of the fixed object;
      obtaining a location coordinate of an intersection point between a target line segment from a location corresponding to a center of the radar and the line segment of the reflective surface;

determining that the moving target is in the NLOS area when the angle of the moving target is positioned between the angle of the first end point and the angle of the second end point of the fixed object, and the distance of the moving target is greater than the distance of the intersection point.

9. The apparatus of claim 8, wherein the instructions are further configured to cause the one or more processors to:
extract the location coordinate of the first end point of the fixed object and the location coordinate of the second point of the fixed object from a camera image acquired through a camera installed in the vehicle; and
extract the location coordinates of the moving target from the radar data.

10. The apparatus of claim 8, wherein the instructions are further configured to cause the one or more processors to:
acquire a driving direction of the vehicle and a driving speed of the vehicle; and
classify the fixed object as fixed and classify the moving target as moving by using the driving direction of the vehicle and the driving speed of the vehicle.

11. The apparatus of claim 10, wherein the instructions are further configured to cause the one or more processors to:
estimate a speed of the fixed object and a speed of the moving target from the radar data,
classify the fixed object as being fixed based on the fixed object having a same speed as the driving speed of the vehicle in the driving direction, and
classify the moving target as being moving based on the moving target having a direction and a speed that differs from the driving direction of the vehicle and the driving speed of the vehicle.

12. The apparatus of claim 8, wherein the instructions are further configured to cause the one or more processors to:
calculate the actual location coordinates of the moving target by mirroring the location coordinates of the moving target based on the line segment of the reflective surface.

13. The apparatus of claim 8, wherein the instructions are further configured to cause the one or more processors to:
display graphics representing the moving target in an image area corresponding to the LOS area, and display graphics representing the moving target in an image area corresponding to the location coordinates of the moving target in an image area corresponding to the NLOS area.

* * * * *